(12) United States Patent
Gere

(10) Patent No.: US 8,761,596 B2
(45) Date of Patent: Jun. 24, 2014

(54) DICHROIC APERTURE FOR ELECTRONIC IMAGING DEVICE

(75) Inventor: David S. Gere, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 163 days.

(21) Appl. No.: 13/013,894

(22) Filed: Jan. 26, 2011

(65) Prior Publication Data
US 2011/0115964 A1 May 19, 2011

Related U.S. Application Data

(63) Continuation of application No. 12/239,547, filed on Sep. 26, 2008, now Pat. No. 7,881,603.

(51) Int. Cl.
*G03B 11/00* (2006.01)
*H04N 5/225* (2006.01)
*G02B 5/22* (2006.01)
*G02B 5/23* (2006.01)

(52) U.S. Cl.
USPC ............ 396/275; 348/342; 359/722; 359/887

(58) Field of Classification Search
USPC ............. 396/50, 275; 348/42, 61, 222.1, 342; 359/722, 887
See application file for complete search history.

(56) References Cited

U.S. PATENT DOCUMENTS

| | | |
|---|---|---|
| 3,363,104 A | 1/1968 | Waite et al. |
| 3,761,947 A | 9/1973 | Volkmann et al. |
| 4,620,222 A | 10/1986 | Baba et al. |
| 4,691,366 A | 9/1987 | Fenster et al. |
| 4,823,194 A | 4/1989 | Mishima et al. |
| 4,992,666 A | 2/1991 | Robertson |
| 5,086,478 A | 2/1992 | Kelly-Mahaffey et al. |
| 5,272,473 A | 12/1993 | Thompson et al. |

(Continued)

FOREIGN PATENT DOCUMENTS

| | | |
|---|---|---|
| EP | 167314 | 1/1986 |
| EP | 2053844 | 4/2009 |

(Continued)

OTHER PUBLICATIONS

Author Unknown, "YCbCr," http://en.wikipedia.org/wiki/r/Y%27CbCr, 4 pages, at least as early as Jun. 17, 2010.

(Continued)

*Primary Examiner* — Rochelle-Ann J Blackman
(74) *Attorney, Agent, or Firm* — Brownstein Hyatt Farber Schrek, LLP

(57) ABSTRACT

A dichroic filter that for use with an electronic imaging device, such as a camera. The dichroic filter is located in the main imaging lens, and may permit all light to pass through a first portion and be measured by a photosensor, while restricting at least some portions of visible light from passing through a second portion thereof. In this manner, only the non-restricted portions of visible light passing through the second portion may be measured by the associated pixels of the photosensor. The filter may be formed from a first aperture permitting a first set of wavelengths to pass therethrough and a second aperture adjacent the first aperture, the second aperture permitting only a subset of the first set of wavelengths to pass therethrough. The second aperture may be a dichroic mirror or it may be an optical filter of some other type.

13 Claims, 5 Drawing Sheets

(56) References Cited

U.S. PATENT DOCUMENTS

| | | | |
|---|---|---|---|
| 5,274,494 A | 12/1993 | Rafanelli et al. | |
| 5,283,640 A | 2/1994 | Tilton | |
| 5,337,081 A * | 8/1994 | Kamiya et al. | 348/61 |
| 5,625,408 A | 4/1997 | Matsugu et al. | |
| 5,748,199 A | 5/1998 | Palm | |
| 5,757,423 A | 5/1998 | Tanaka et al. | |
| 6,002,423 A | 12/1999 | Rappaport et al. | |
| 6,043,838 A | 3/2000 | Chen | |
| 6,215,898 B1 | 4/2001 | Woodfill et al. | |
| 6,282,655 B1 | 8/2001 | Given | |
| 6,310,662 B1 | 10/2001 | Sunakawa et al. | |
| 6,339,429 B1 | 1/2002 | Schug | |
| 6,389,153 B1 | 5/2002 | Imai et al. | |
| 6,416,186 B1 | 7/2002 | Nakamura | |
| 6,421,118 B1 | 7/2002 | Shaar | |
| 6,456,339 B1 | 9/2002 | Surati et al. | |
| 6,516,151 B2 | 2/2003 | Pilu | |
| 6,525,772 B2 | 2/2003 | Johnson et al. | |
| 6,560,711 B1 | 5/2003 | Given et al. | |
| 6,561,654 B2 | 5/2003 | Mukawa et al. | |
| 6,614,471 B1 | 9/2003 | Ott | |
| 6,618,076 B1 | 9/2003 | Sukthankar et al. | |
| 6,636,292 B2 | 10/2003 | Roddy et al. | |
| 6,807,010 B2 | 10/2004 | Kowarz | |
| 6,862,022 B2 | 3/2005 | Slupe | |
| 6,862,035 B2 | 3/2005 | Jeong et al. | |
| 6,877,863 B2 | 4/2005 | Wood et al. | |
| 6,921,172 B2 | 7/2005 | Ulichney et al. | |
| 6,924,909 B2 | 8/2005 | Lee et al. | |
| 6,930,669 B2 | 8/2005 | Weiner et al. | |
| 6,931,601 B2 | 8/2005 | Vronay et al. | |
| 6,970,080 B1 | 11/2005 | Crouch et al. | |
| 7,028,269 B1 | 4/2006 | Cohen-Solal et al. | |
| 7,058,234 B2 | 6/2006 | Gindele et al. | |
| 7,079,707 B2 | 7/2006 | Baron | |
| 7,103,212 B2 | 9/2006 | Hager et al. | |
| 7,123,292 B1 | 10/2006 | Seeger et al. | |
| 7,123,298 B2 | 10/2006 | Schroeder et al. | |
| 7,307,709 B2 | 12/2007 | Lin et al. | |
| 7,324,681 B2 | 1/2008 | Chang et al. | |
| 7,352,913 B2 | 4/2008 | Karuta et al. | |
| 7,370,336 B2 | 5/2008 | Husain et al. | |
| 7,413,311 B2 | 8/2008 | Govorkov et al. | |
| 7,453,510 B2 | 11/2008 | Kolehmainen et al. | |
| 7,460,179 B2 | 12/2008 | Pate et al. | |
| 7,483,065 B2 | 1/2009 | Gruhike et al. | |
| 7,512,262 B2 | 3/2009 | Criminisi et al. | |
| 7,551,771 B2 | 6/2009 | England | |
| 7,561,731 B2 | 7/2009 | Wallace et al. | |
| 7,567,271 B2 | 7/2009 | Berestov | |
| 7,570,881 B2 | 8/2009 | Perala et al. | |
| 7,590,335 B2 | 9/2009 | Kobayashi et al. | |
| 7,590,992 B2 | 9/2009 | Koplar et al. | |
| 7,594,319 B2 | 9/2009 | Nakamura et al. | |
| 7,598,980 B2 | 10/2009 | Imai et al. | |
| 7,613,389 B2 | 11/2009 | Suzuki et al. | |
| 7,629,897 B2 | 12/2009 | Koljonen | |
| 7,641,348 B2 | 1/2010 | Yin et al. | |
| 7,643,025 B2 | 1/2010 | Lange | |
| 7,653,304 B2 | 1/2010 | Nozaki et al. | |
| 7,658,498 B2 | 2/2010 | Anson | |
| 7,834,846 B1 | 11/2010 | Bell | |
| 7,869,204 B2 | 1/2011 | Bair et al. | |
| 7,881,603 B2 * | 2/2011 | Gere | 396/275 |
| 7,901,084 B2 | 3/2011 | Willey et al. | |
| 7,925,077 B2 | 4/2011 | Woodfill et al. | |
| 7,964,835 B2 | 6/2011 | Olsen et al. | |
| 8,044,880 B2 | 10/2011 | Nakamura et al. | |
| 8,094,195 B2 | 1/2012 | Butterworth | |
| 8,147,731 B2 | 4/2012 | Nimmakayala et al. | |
| 8,319,822 B2 | 11/2012 | McClatchie | |
| 2002/0021288 A1 | 2/2002 | Schug | |
| 2003/0038927 A1 | 2/2003 | Alden | |
| 2003/0086013 A1 | 5/2003 | Aratani | |
| 2003/0117343 A1 | 6/2003 | Kling | |
| 2004/0119988 A1 | 6/2004 | Chen et al. | |
| 2004/0189796 A1 | 9/2004 | Ho et al. | |
| 2004/0193413 A1 | 9/2004 | Wilson et al. | |
| 2005/0046968 A1 * | 3/2005 | Beatson et al. | 359/722 |
| 2005/0132408 A1 | 6/2005 | Dahley et al. | |
| 2005/0146634 A1 * | 7/2005 | Silverstein et al. | 348/360 |
| 2005/0168583 A1 | 8/2005 | Thomason | |
| 2005/0182962 A1 | 8/2005 | Given et al. | |
| 2005/0280786 A1 | 12/2005 | Moiroux et al. | |
| 2006/0140452 A1 | 6/2006 | Raynor et al. | |
| 2006/0197843 A1 | 9/2006 | Yoshimatsu | |
| 2007/0027580 A1 | 2/2007 | Ligtenberg et al. | |
| 2007/0177279 A1 | 8/2007 | Cho et al. | |
| 2007/0236485 A1 | 10/2007 | Trepte | |
| 2007/0300312 A1 | 12/2007 | Chitsaz et al. | |
| 2008/0062164 A1 | 3/2008 | Bassi et al. | |
| 2008/0131107 A1 | 6/2008 | Ueno | |
| 2008/0191864 A1 | 8/2008 | Wolfson | |
| 2009/0008683 A1 * | 1/2009 | Nishizawa | 257/292 |
| 2009/0015662 A1 | 1/2009 | Kim et al. | |
| 2009/0027337 A1 | 1/2009 | Hildreth | |
| 2009/0051797 A1 | 2/2009 | Yao | |
| 2009/0115915 A1 | 5/2009 | Steinberg et al. | |
| 2009/0116732 A1 | 5/2009 | Zhou et al. | |
| 2009/0221368 A1 | 9/2009 | Yen et al. | |
| 2009/0262306 A1 | 10/2009 | Quinn et al. | |
| 2009/0262343 A1 | 10/2009 | Archibald | |
| 2009/0273679 A1 | 11/2009 | Gere et al. | |
| 2009/0309826 A1 | 12/2009 | Jung et al. | |
| 2010/0060803 A1 | 3/2010 | Slack et al. | |
| 2010/0061659 A1 | 3/2010 | Slack et al. | |
| 2010/0073499 A1 * | 3/2010 | Gere | 348/222.1 |
| 2010/0079426 A1 | 4/2010 | Pance et al. | |
| 2010/0079468 A1 | 4/2010 | Pance et al. | |
| 2010/0079653 A1 | 4/2010 | Pance | |
| 2010/0083188 A1 | 4/2010 | Pance et al. | |
| 2010/0103172 A1 | 4/2010 | Purdy | |
| 2010/0309287 A1 | 12/2010 | Rodriguez | |
| 2011/0074931 A1 | 3/2011 | Bilbrey et al. | |
| 2011/0075055 A1 | 3/2011 | Bilbrey | |
| 2011/0149094 A1 | 6/2011 | Chen et al. | |
| 2011/0200247 A1 | 8/2011 | Ravid et al. | |
| 2012/0044322 A1 | 2/2012 | Tian et al. | |
| 2012/0044328 A1 | 2/2012 | Kessler et al. | |
| 2012/0076363 A1 | 3/2012 | Kessler et al. | |

FOREIGN PATENT DOCUMENTS

| | | |
|---|---|---|
| JP | 2002354493 | 12/2002 |
| JP | 2003-299113 | 10/2003 |
| JP | 2005-197792 | 7/2005 |
| KR | 10-2007-0100890 | 10/2007 |
| KR | 10-2009-0049343 | 5/2009 |
| WO | WO93/11631 | 6/1993 |
| WO | WO2007/100057 | 9/2007 |
| WO | WO2009/001512 | 12/2008 |

OTHER PUBLICATIONS

Koschan et al., "Finding Objects in a 3D Environment by Combining Distance Measurement and Color Indexing," IEEE, vol. 1, pp. 858-861, Oct. 2001.

Sokolova et al., "Experiments in Stereo Vision," Computer Science 570, Final Project, http://disparity.wikidot.com/, 14 pages, at least as early as Jun. 16, 2010.

Stern et al., "Three-Dimensional Image Sensing, Visualization, and Processing Using Integral Imaging," *Proceedings of the IEEE*, Mar. 2006, vol. 94, No. 3, pp. 591-607.

Thomas, "An Introduction to Photo Stitching," *Eastern Suburbs Photographic Society*, 2007, 12 pages.

Wang, *Video Processing and Communications*, 2001, Prentice-Hall, Chapter 1: Video Formation, Perception, and Representation, pp. 1-32.

\* cited by examiner

DICHROIC APERTURE FOR ELECTRONIC IMAGING DEVICE

CROSS-REFERENCE TO RELATED APPLICATIONS

This application is a continuation patent application of U.S. patent application Ser. No. 12/239,547, filed Sep. 26, 2008 and titled "Dichroic Aperture for Electronic Imaging Device," the disclosure of which is hereby incorporated herein in its entirety.

TECHNICAL FIELD

The present invention relates generally to imaging devices, and more particularly to an imaging device, such as a camera or video camera, having a dichroic aperture or filter.

BACKGROUND

The continuing decrease in manufacturing costs of electronic imaging devices, combined with increasing functionality and enhanced user interfaces, have led to increased and widespread usage. Electronic cameras and video cameras are found not only as freestanding devices used to document trips and preserve memories, but also for communication. For example, such devices may be incorporated into computers or used as computing peripherals to permit video conferencing, video chatting and so on.

Most electronic imaging devices employ a photosensor made of a grid of light-sensitive pixels. These pixels may measure the intensity of light impacting them. By aggregating these measurements, images may be created. However, the individual pixels generally are poor at sensing or reporting particular colors of light. Accordingly, a filter may be used to restrict the colors that impact any given pixel. As one example, a Bayer filter is often used to limit light impacting each pixel to red, green or blue light.

Given that each pixel only senses a particular color of light and the positions of each such pixel are known, color data may be extrapolated from constituent red, green and blue images formed by those pixels sensing each respective color. In this manner, color images may be created.

However, conventional single-chip color image sensors typically have fewer pixels dedicated to sensing red and blue image planes as compared to the green image plane, since red and blue light contributes less to the human eye's overall perception of resolution (e.g., luminance) than does green light. Further, many present color image sensors must strike a balance between resolution and noise in a picture. As resolution increases, so too may noise. This, in turn, leads to degradation and artifacting of the color image.

SUMMARY

Generally, one embodiment of the present invention takes the form of a dichroic filter that may be used with an electronic imaging device, such as a camera. The dichroic filter may permit all light to pass through a first portion and be measured by a photosensor, while restricting at least some portions of visible light from passing through a second portion thereof. In this manner, only the non-restricted portions of visible light passing through the second portion may be measured by the associated pixels of the photosensor.

Another embodiment may be a filter for a camera or other electronic imaging device, comprising: a first aperture permitting a first set of wavelengths to pass therethrough; and a second aperture adjacent the first aperture, the second aperture permitting only a subset of the first set of wavelengths to pass therethrough. In such an embodiment, the second aperture may encircle the first aperture. Further, the first set of wavelengths may be wavelengths from approximately 400 to 750 nanometers (nm). Similarly, the subset of the first set of wavelengths may range from approximately 400 to 495 nm. In certain embodiments, the second aperture may be a dichroic mirror. The embodiment may be integrated into the camera; as one example the embodiment may be the main lens of the camera or a portion thereof, such as the aperture. An alternative embodiment may be detachable from the imaging device. For example, such an embodiment may be a filter or specialty lens that is attached to the camera as necessary, and may either overlie or take the place of the standard lens.

Still further, in certain embodiments such as the foregoing the photosensor may be made of a grid of light-sensitive pixels and a filter array overlying at least a portion of the grid. The filter array may permit only wavelengths corresponding to certain colors to reach individual pixels of the grid; each pixel may be overlaid by a part of the filter that permits only wavelengths of a single color type to impinge upon (and so be detected by) the pixel. For example, the filter array may be a Bayer filter.

In addition, yet other embodiments may have an aperture with first and second segments as previously defined, but also including a third segment defining a third set of light-transmissive properties and permitting only red light to pass therethrough. In such embodiments, the third segment may encircle the first segment and the second segment encircle the third segment. Further, the second and third segments may define dichroic mirrors.

DETAILED DESCRIPTION

Generally, one embodiment of the present invention may take the form of a dichroic element used by or incorporated into an imaging device. For example, one embodiment may be a filter having dichroic properties and designed to fit over a lens of a camera. Yet another embodiment may be a camera having an integral dichroic filter, lens, or so forth. An "imaging device," as used herein, is any device that may electronically capture an image, such as a camera, video recorder and so forth. The imaging device may be incorporated into any number of electronic components, including a computer, portable computing device, mobile telephone, and so forth, or may stand alone.

A "dichroic" element, such as the aforementioned filter and lens, is one that treats, passes or filters different wavelengths of light differently. A dichroic lens or filter generally defines two areas on the surface of the lens/filter, each of which passes a unique spectrum of wavelengths of visible light. As one non-limiting example, a dichroic lens or filter may define two concentric areas, such as a first circular area and a second annular area encircling the circular area or portion. The circular area may transmit all visible light to a sensor associated with the filter, while the annular portion may transmit only wavelengths corresponding to the blue segment of the visible light spectrum. That is, the annular portion may pass only light having a wavelength of approximately 440 to 490 nanometers to the sensor ("blue light"). Thus, since the annular segment encircles and abuts the circular area, the sensor may sense blue light through a larger aperture than it senses other wavelengths. References to "red light" and/or "green light" are intended to encompass those portions of the spectrum commonly making up the given colors, rather than a single, particular wavelength.

For purposes of simplicity, reference made herein to a dichroic "filter" encompasses both a lens and a filter, as appropriate. Likewise, insofar as this document generally discusses a dichroic filter/aperture for use with an imaging device, it should be understood that any such imaging device may natively incorporate the filter or may employ the filter as an add-on element.

Figure 1:
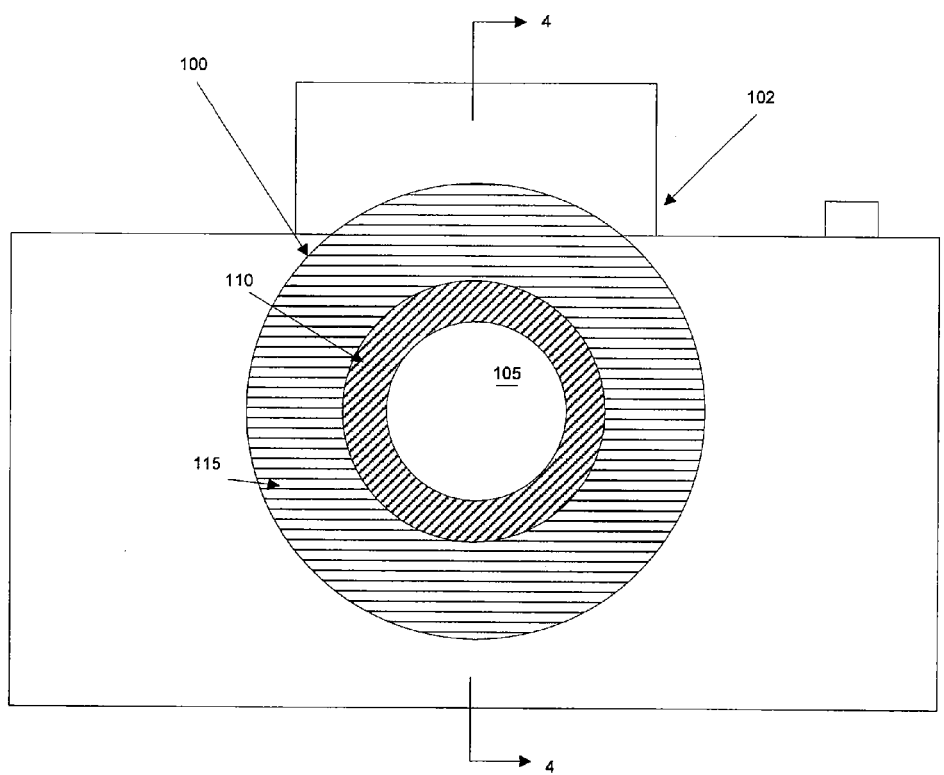
FIG. 1 is a top-down view of a first embodiment of the present invention.
Figure 2:
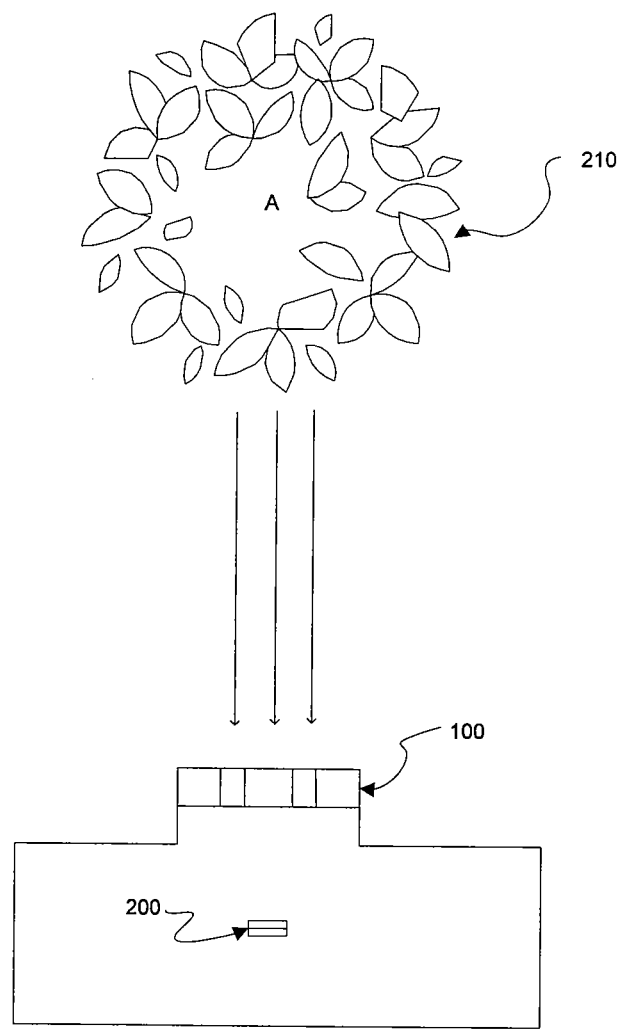
FIG. 2 is a cross-sectional view of a portion of the embodiment of FIG. 1 in a sample operating environment.

FIG. 1 generally depicts a top-down view of a first embodiment taking the form of a dichroic filter 100 incorporated into an electronic imaging device 102, while FIG. 2 shows a cross-sectional side view of the same filter. It should be noted that FIGS. 1 and 2 show the filter 100 formed on, or as, the main lens of the electronic imaging device 102. In alternative embodiments, however, the filter 100 may be a removable lens or aperture that is releasably attached to the imaging device. The filter 100 includes a circular or round segment 105, a second annular segment 110 encircling (and typically abutting the circular segment), and an exterior segment 115 surrounding the annular segment. (For reference, the terms "segment," "portion" and "section" are generally used interchangeably herein.) Each portion of the filter has different light-transmissive properties, as described in more detail below. The shading shown in FIG. 1 and subsequent figures is provide only to enhance visual perception of the various elements and is not intended to represent any requirement, coloring or physical property of the embodiment or any portion thereof. Likewise, although the exterior portion 115 is shown as being round, in many embodiments it may be square, oval, or take any other shape, as may the circular segment 105 and second annular segment 110. Similarly, for both FIG. 1 and following figures showing various embodiments, the figures are intended as representative and not exact. Thus, the figures do not represent exact proportions between constituent elements.

As shown in FIG. 2, the filter 100 generally is positioned between an electronic sensor 200 and an object 210, such that light reflects off the object 210, passes through the filter 100 and impacts the sensor 200. The sensor may be any electronic sensor capable of detecting various wavelengths of light, such as those commonly used in digital cameras, digital video cameras, mobile telephones and personal digital assistants, web cameras and so forth. Typically, such cameras employ a sensor formed from an array of color-sensitive pixels. That is, each pixel of the sensor 200 may detect at lease one of the various wavelengths that make up visible light; the signal generated by each such pixel varies depending on the wavelength of light impacting it so that the array may thus reproduce an image of the object 210.

Figure 3:
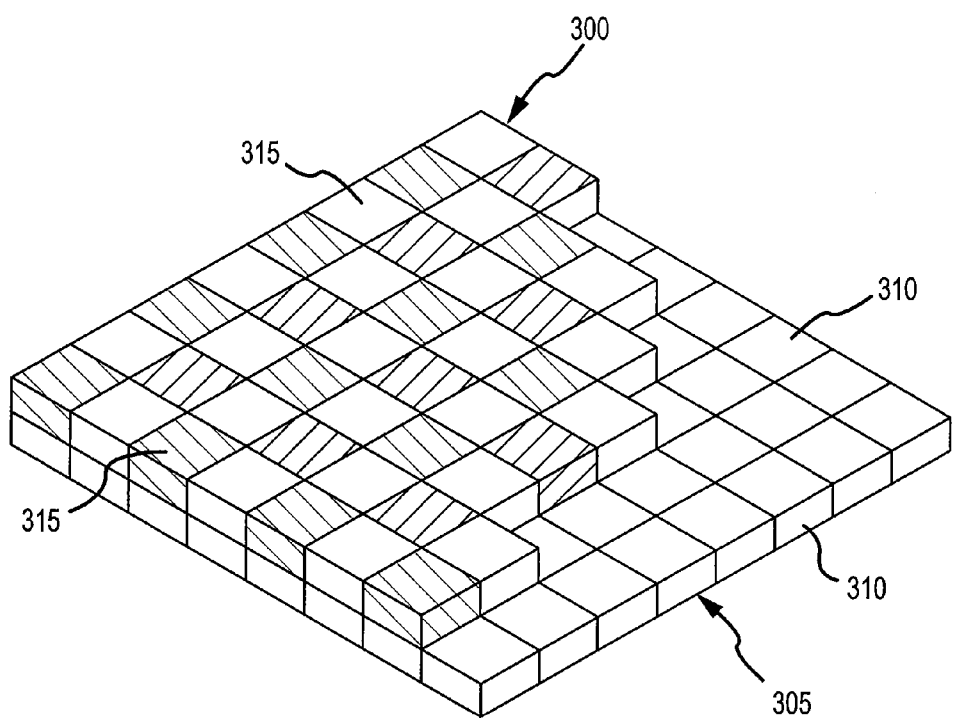
FIG. 3 depicts a Bayer filter array and photosensor.

Often, the sensor 200 uses a filter with a Bayer array 300 overlaying the photosensor 305, as shown in FIG. 3. In a Bayer array 300, the sample rate (e.g., number of samples per unit of area) is twice as high for green light wavelengths as red or blue light wavelengths. That is, a standard Bayer filter array has a filter pattern that is 50% green, 25% red and 25% blue, where each color in the filter permits that light, and only that light, to pass therethrough. Each pixel 310 of the photosensor 305 is overlaid by a pixel 315 of the Bayer array 300; each Bayer pixel 315 filters all but one wavelength of light. Thus, 50% of the pixels forming the array of the image sensor detect only green light because the green portion of the Bayer filter overlies them, 25% detect only red light because the red portion of the Bayer filter overlies them, and 25% detect only blue light because the blue portion of the Bayer filter overlies them. Bayer filters 300 are commonly used with digital cameras and other image-capturing or photosensitive devices. In FIG. 3, the blue pixels are shown with a first shading pattern and the red pixels with a second shading pattern while the green pixels are unshaded. Further, it should be understood that only a portion of the exemplary filter array 300 is shown in order to expose some pixels 310 of the underlying photosensor 305.

This array is designed to generally mimic the perception of the human eye, which is roughly twice as sensitive to green light as to either red or blue light. Thus, the sensor may detect luminance in approximately the same manner as the human eye. Luminance may be expressed as a weighted sum of red, green and blue wavelengths in the following manner:

$$L=0.59G+0.3R+0.11B \qquad \text{Equation 1}$$

Where L is luminance, G is green light, R is red light and B is blue light. Accordingly, green light is the major component of luminance for the aforementioned Bayer sensor 200 and the human eye.

Insofar as green light wavelengths contribute approximately six times as much to luminance as blue light wavelengths, both the human eye and the sensor 200 depend much more on green light than red or blue light to determine sharpness or resolution of an image. Given this relationship, the blue portion of an electronically-sensed image may be of lower resolution than the green portion without significantly affecting overall image sharpness.

Likewise, by increasing the signal level of the blue portion of an image while maintaining the signal levels of the red and green portions, the overall signal level of the image may be enhanced. One way to increase blue signal level is by employing a lens with a dichroic filter 100, as shown in FIG. 1. The dichroic filter defines two different areas 105, 110 that permit light to pass therethrough and impinge upon a sensor located behind the filter. The sensor may be a photosensor overlaid with the aforementioned Bayer filter. Alternatively, the sensor may be a photosensor overlaid with a filter such as a CYGM (cyan, yellow, green, magenta) or RGBE (red, green, blue, emerald) filter, may be a Foveon X3 sensor, or may use separate charge-coupled devices, one for each color. Unless specifically stated otherwise, the term "sensor" is used herein for the combination of the filter, if any, and photosensor, while the term "photosensor" refers specifically to a pixel array that detects light. The term "sensor," however, is intended to encompass light sensing devices lacking a filter layer.

Image data, such as the wavelength of light detected by the photosensor, may be electronically conveyed via a pixel-processing path or other appropriate bus or connection to a processor. Alternatively, the image data may be stored in a memory or storage device before being conveyed to the processor. In either case, the processor uses the image data to construct a full-color image. As part of this process, the processor (which may be dedicated to image processing or encompass other functions) may adjust the color values of the image data or otherwise manipulate the image data. The final full-color image may be outputted to a display either integrated into or outside of the imaging device. Likewise, the final image may be made available for printing or storage either within or outside of the imaging device.

Returning to the discussion of FIG. 1, the circular portion 105 of the dichroic filter 100 permits all colors of light to pass therethrough and be detected by the appropriate pixels of the sensor. Thus, image sensing pixels located beneath the circular segment 105 detect light and images normally.

The annular portion 110 of the dichroic filter, however, permits only blue light to pass therethrough. The annular portion 110 may be a dichroic mirror permitting only blue light to pass therethrough but reflecting other colors of light. The annular portion 110 may be coated with an appropriate optical coating to form the dichroic mirror. Alternatively, the annular portion 110 may be absorptive rather than reflective, such that the annular portion absorbs all non-blue wavelengths of light. The annular portion 110 may be made of glass, plastic or any other suitable material. Any other suitable filter may be employed.

Figure 4:
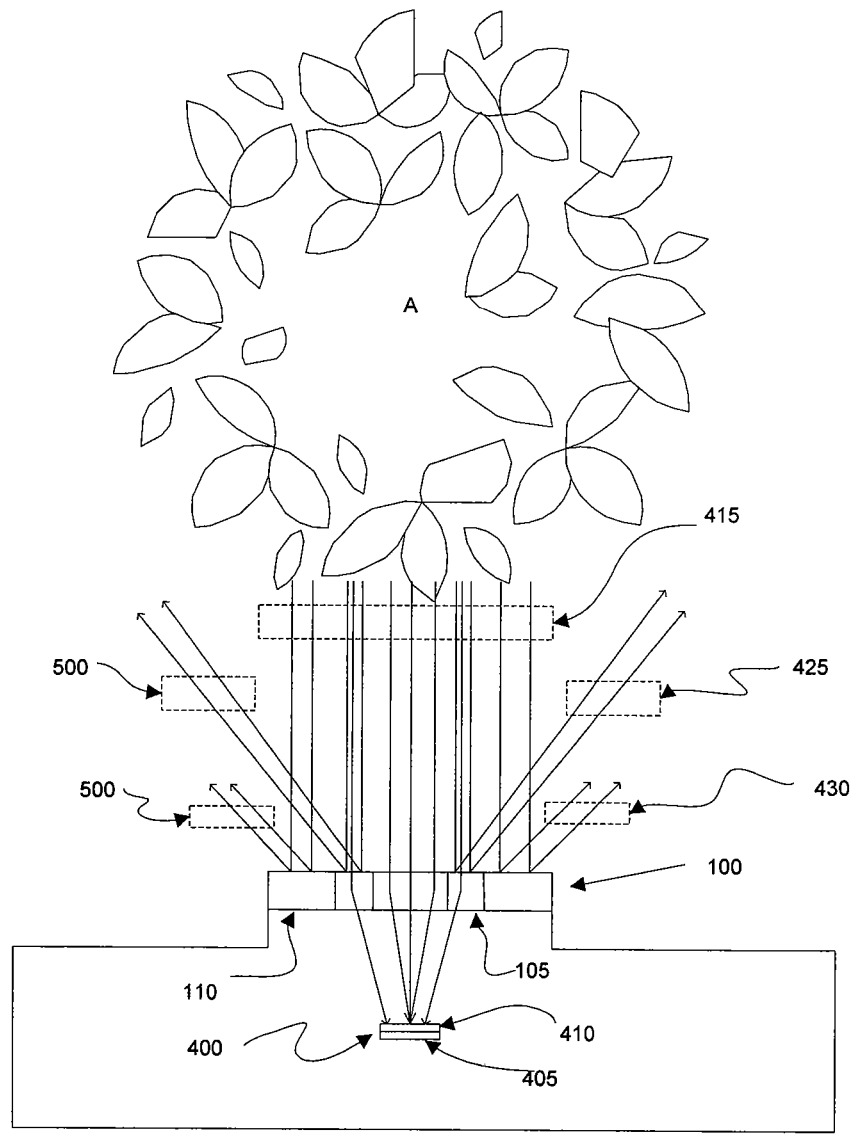
FIG. 4 is a cross-sectional side view of the embodiment of FIG. 1, taken along line 4-4 of FIG. 1.

Presuming the sensor underlies and/or is optically coupled to the dichroic filter 100, it may be appreciated that the sensor detects red, green and blue light. Given that each pixel of the sensor detects only a single color/spectrum of light, one may think of the sensor as having a first area detecting red light, a second area detecting green light and a third area detecting only blue light. The first, second and third areas are equal to one another and overlap for all practical purposes, occupying the entirety of the sensor. Because the interior portion 105 the dichroic filter 100 permits all light to pass through, the area of the sensor receives all wavelengths of light. However, because the annular portion 110 of the dichroic filter 100 permits only blue light to pass therethrough, the amount of blue light reaching the sensor is relatively greater than if the annular portion 110 were not present. "Area" here is measured by the outer bounds of the pixels detecting a given light spectrum without reference to the density of such pixels on the photosensor. That is, the fact that a sensor employing a Bayer filter permits denser detection of green light within a given region than red light is irrelevant for purposes of this definition. It should be noted that FIGS. 2 and 4 depict the sensor and filter/aperture in an illustrative form only; such elements are not drawn to scale or fixed position. Further, the light in these figures (shown by the arrows) converges on the sensor in the manner described above.

Essentially, the dichroic filter 100 separates the lens on which it is placed (or which it forms) into a first and second aperture. The first aperture is defined by the circular segment 105, passes all wavelengths of light and has a first f-number. The second aperture is defined by the combination of the circular segment and annular portion 110, passes only blue light and has an f-number lower than that of the first aperture. Accordingly, the sensor underlying the dichroic filter creates red and green images having high resolutions and a blue image having a lower resolution, but a higher signal-to-noise ratio ("signal level"). The red, green and blue images may be referred to herein as "component images."

As known to those skilled in the art, color data from the three images may be used to interpolate and create a single full-color image. Typically, the created image's resolution and signal level is derived from the signal noises and resolutions of the red, green and blue images. Generally, the luminance resolution of the full-color image is expressed by the same formula previously discussed. Accordingly, decreases in the resolution of the blue component of the full-color image (e.g., in the blue image registered by the photosensor) have a relatively small overall effect on the full-color image's resolution.

By contrast, the full-color image's signal level is dependent on the signal levels of each of the red, green and blue component images. Thus, an increase in the blue signal level, which corresponds to less noise in the blue image, increases the signal level of the full-color image approximately as much as an increase in the red or green signal levels. Such increase may be obtained by increasing the aperture size of only the blue image, as discussed herein.

Given the relatively small impact of the blue component image on resolution but its equal contribution to signal level, a tradeoff of blue image resolution for blue image signal level may be desirable, thereby ultimately creating a full-color image having a relatively minor resolution loss but a significant signal level gain. The embodiment shown in FIG. 1 accomplishes this by forming the red and green images with a slow f-number lens, thereby providing high resolution, and forming the blue image with a fast f-number lens, thereby providing lower resolution but higher signal level. It should be understood that the terms "fast," "slow," "high" and "lower" are used relative to one another.

The exact values of the resolution loss and signal level gain may vary from embodiment to embodiment and image to image based on a number of factors, such as the exact geometry of the dichroic aperture, the color and intensity of light sensed by the photosensor, the target capture din the image, quality of the electronics in the image capture device incorporating the dichroic aperture and/or photosensor, and so forth. Accordingly, exact values are not set forth herein.

FIG. 4 depicts a cross-sectional side view of the dichroic aperture and photosensor array discussed with respect to FIG. 1, taken along line 4-4 of FIG. 1. With reference to FIG. 1 and FIG. 4, the dichroic filter 100 is divided into various sections having different transmissive properties such that portions of the sensor 400 associated with each of the filter portions receive light of varying wavelengths. The sensor 400 is located beneath the dichroic filter and generally senses the light passing through the various segments of the filter. The sensor may be made of a Bayer array 410 placed atop a light-sensitive array 405. The light-sensitive array 405, in turn, may be divided into multiple light-sensitive pixels. Thus, the composition of the photosensor 400 is similar to that described with respect to the photosensor 200 of FIG. 2.

As an example, presume white light 415 made up of various wavelengths impacts the dichroic filter 100. The center segment 105 of the dichroic filter 100 does not filter any wavelengths of visible light. Accordingly, all wavelengths of light passing through that portion of the filter and impacting the photosensor 400 can be measured and used to create the red, green and blue component images.

By contrast, the dichroic annular portion 110 reflects all non-blue light 420, thus permitting only blue light 425 to pass therethrough. This blue light 425 may fall upon, and be sensed by, the sensor 400. In this manner, the red and green component images may be formed by the photosensor 400 with higher resolution and lower signal level, while the blue image is formed with lower resolution and higher signal level.

Figure 5:
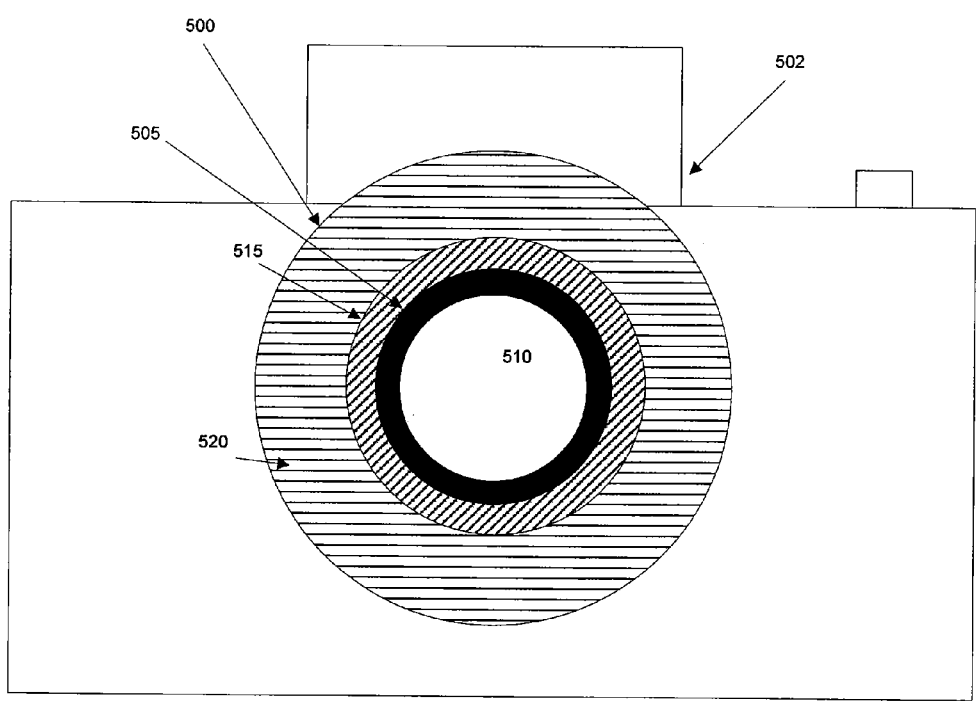
FIG. 5 is a top-down view of a second embodiment of the present invention.

FIG. 5 is a top-down view of an alternative embodiment of a filter or lens for an imaging device. This embodiment 500 is similar to the dichroic filter of FIG. 1 but instead adds a second dichroic annular portion 505 and may thus be considered a trichroic filter. As with the filter shown in FIG. 1, the inner portion 510 permits light of all wavelengths to pass therethrough and the outer ring-shaped portion 515 permits only blue light to pass. The second annular portion 505 is a dichroic mirror permitting only red and blue light to pass therethrough. It is conceptually similar to the blue-filtering outer portion 515 or the annular segment 110 of the dichroic filter shown in FIG. 1 and may be constructed in a similar fashion. That is, the second annular portion 505 may be a dichroic mirror reflecting all green light or may be absorptive of green wavelengths.

Essentially, the trichroic filter, in combination with an appropriate photosensor, creates a green composite image, a red composite image having higher signal level and lower resolution than the green image, and a blue composite image having higher signal level and lower resolution than the red image. This may enhance signal level even more than the dichroic filter in certain applications while maintaining a relatively small negative change in luminance resolution, given the effect of each color channel on luminance shown in Equation 1.

Although this discussion generally deals with electronic imaging devices, it should be appreciated that the principles set forth herein may be applied to film-based imaging devices such as a standard film camera. Likewise, the exact type of photosensor, filter layer and/or dichroic coating have not been specified insofar as they may vary between embodiments. Accordingly, the proper scope of protection is defined by the following claims.

I claim:

1. A filter for a camera, comprising:
   a first aperture having a first light-transmissive property; and
   a second aperture adjacent the first aperture, the second aperture having a second light-transmissive property; wherein
   the first and second light-transmissive properties are different; and
   the first and second apertures are unitarily formed as a single lens.

2. The filter of claim 1, wherein the second aperture abuts the first aperture.

3. The filter of claim 1, wherein:
   the first light-transmissive property comprises passing a first set of wavelengths of light;
   the second light-transmissive property comprises passing a second set of wavelengths of light; and
   the second set of wavelengths of light is different from the first set of wavelengths of light.

4. The filter of claim 3, wherein the second set of wavelengths is a subset of the first set of wavelengths.

5. The filter of claim 3, wherein the second set of wavelengths does not overlap with the first set of wavelengths.

6. The filter of claim 3, further comprising a third aperture abutting at least one of the first and second aperture, the third aperture transmitting substantially all wavelengths of visible light.

7. An electronic imaging device, comprising:
   a filter;
   a photosensor operatively connected to the filter; and
   a processor operatively connected to the photosensor; wherein
   the filter defines at least a first and second region;
   the first region permits light of a first wavelength set to be detected by a first portion of the photosensor;
   the second region permits light of a second wavelength set to be detected by a second portion of the photosensor; wherein
   the at least first and second regions are unitarily formed as a single lens; and
   a signal level of a first signal corresponding to the light detected by the first region is less than a signal level of a second signal corresponding to the light detected by the second region.

8. The electronic imaging device of claim 7, wherein:
   the first region has a first f-number; and
   the second region has a second f-number and is adjacent the first region.

9. The electronic imaging device of claim 8, wherein:
   the first region passes light in a red region of the color spectrum; and
   the second region passes light in a blue region of the color spectrum.

10. The electronic imaging device of claim 9, wherein an aperture of the second region is greater than an aperture of the first region.

11. The electronic imaging device of claim 7, wherein the processor is operative to create a single image from at least the first and second signals.

12. The electronic imaging device of claim 11, wherein:
    the second signal corresponds to a blue image; and
    the first signal corresponds is a non-blue image.

13. The electronic imaging device of claim 12, wherein the blue image has decreased noise and resolution in comparison to the non-blue image.

* * * * *